United States Patent [19]

Tanaka et al.

[11] Patent Number: 5,416,621
[45] Date of Patent: May 16, 1995

[54] DRIVING METHOD FOR FERROELECTRIC LIQUID CRYSTAL SPATIAL LIGHT MODULATOR

[75] Inventors: Yukio Tanaka, Kadoma; Akio Takimoto; Koji Akiyama, both of Neyagawa; Yasunori Kuratomi; Junko Asayama, both of Suita; Hisahito Ogawa, Nara, all of Japan

[73] Assignee: Matsushita Electric Industrial Co., Ltd., Osaka, Japan

[21] Appl. No.: 73,060

[22] Filed: Jun. 8, 1993

[30] Foreign Application Priority Data

Jun. 11, 1992 [JP] Japan ................... 4-151763

[51] Int. Cl.⁶ ............................ G02F 1/1335/1/135
[52] U.S. Cl. ............................ 359/72; 359/56
[58] Field of Search ........... 359/56, 72, 48, 100, 359/256; 345/87, 94, 97; 348/761, 751, 766

[56] References Cited

U.S. PATENT DOCUMENTS

| 4,941,735 | 7/1990 | Moddel et al. | 359/72 |
| 5,130,830 | 7/1992 | Fukushima et al. | 359/72 |
| 5,221,980 | 6/1993 | Yamamoto et al. | 359/72 |
| 5,231,282 | 7/1993 | Nishi et al. | 359/72 |

OTHER PUBLICATIONS

Gomes, Cleber M. et al., "Ferroelectric Liquid Crystal Spatial Light Modulator with Gray–Scale Copability," Japanese Journal of Applied Physics, vol. 30, No. 3, Mar. 1991, pp. L386–L388.

Bone, Matthew et al., "Video–Rate Photoaddressed Ferroelectric LC Light Valve with Gray Scale," SID 91 Digest (1991), pp. 254–256.

Li, Wen et al., "Hydrogenated Amorphous–Silicon Photosensor for Optically Addressed High-Speed Spatial Light Modulator," IEEE Transactions on Electron Devices, vol. 36, No. 12, Dec. 1989, pp. 2959–2964.

Primary Examiner—William L. Sikes
Assistant Examiner—Tai V. Duong
Attorney, Agent, or Firm—Fish & Richardson

[57] ABSTRACT

In a spatial light modulator used in a projection type display, holographic television set or the like and having a configuration of at least a photo-conductive layer with rectification and a ferroelectric liquid crystal layer provided between a pair of transparent electrodes and a side of the photo-conductive layer facing to a CRT, plural units of driving signals including at least an erasing pulse and a writing voltage period are applied between the transparent electrodes in one frame cycle of the CRT.

8 Claims, 16 Drawing Sheets

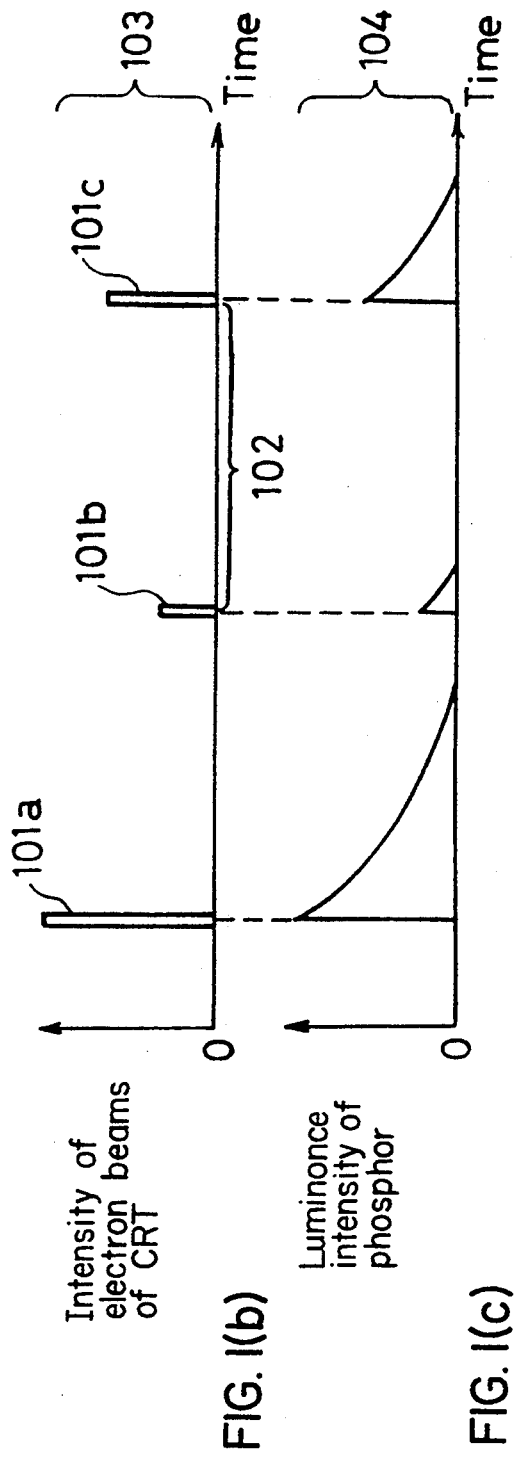
FIG. 1(a) Intensity of electron beams of CRT
FIG. 1(b) Luminance intensity of phosphor
FIG. 1(c) Driving signals of spatial light modulator
FIG. 1(d) Intensity of output light from spatial light modulator

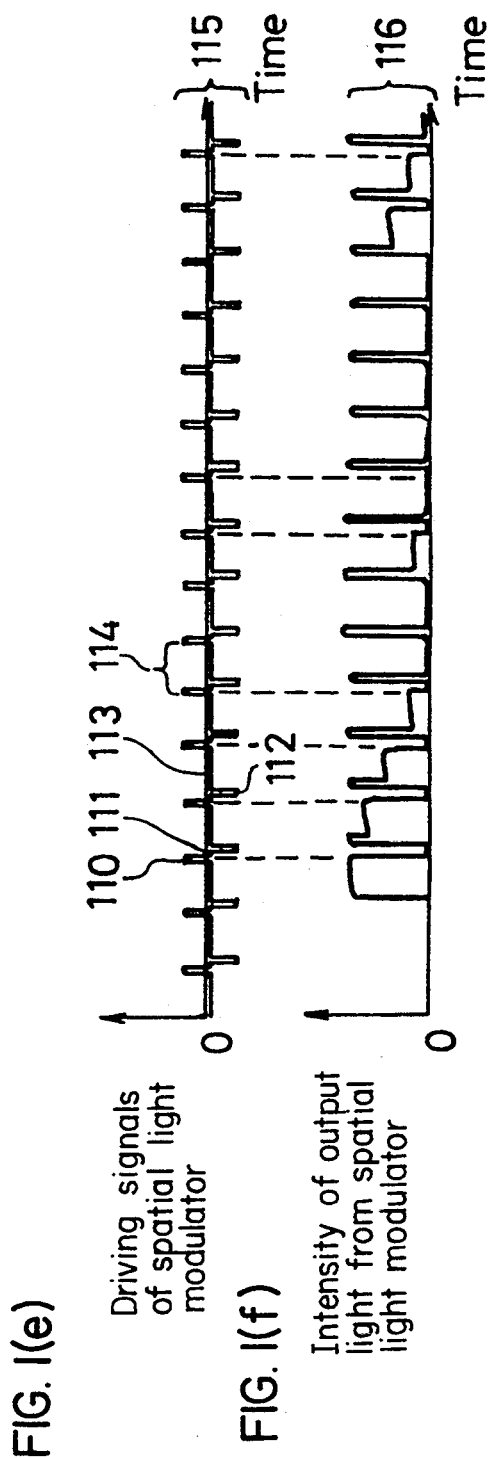

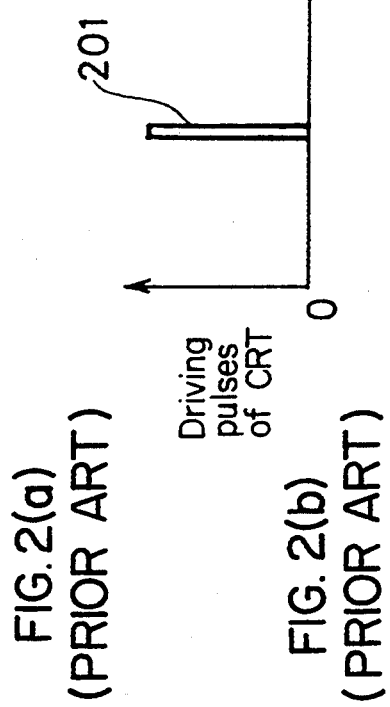

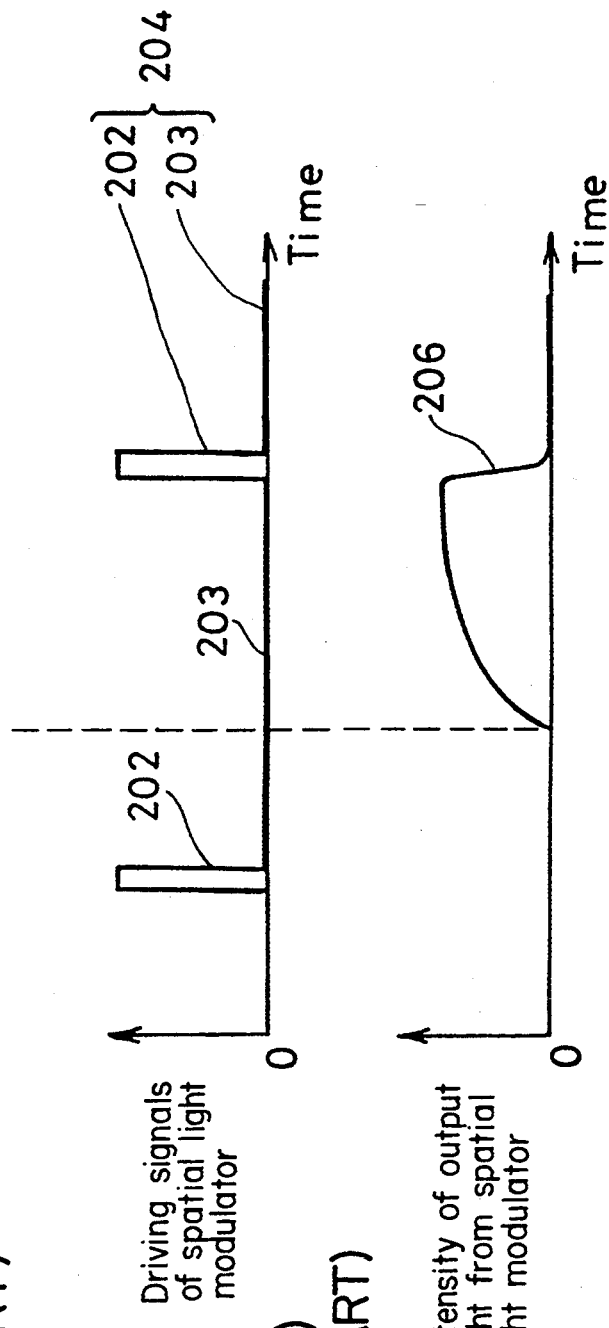

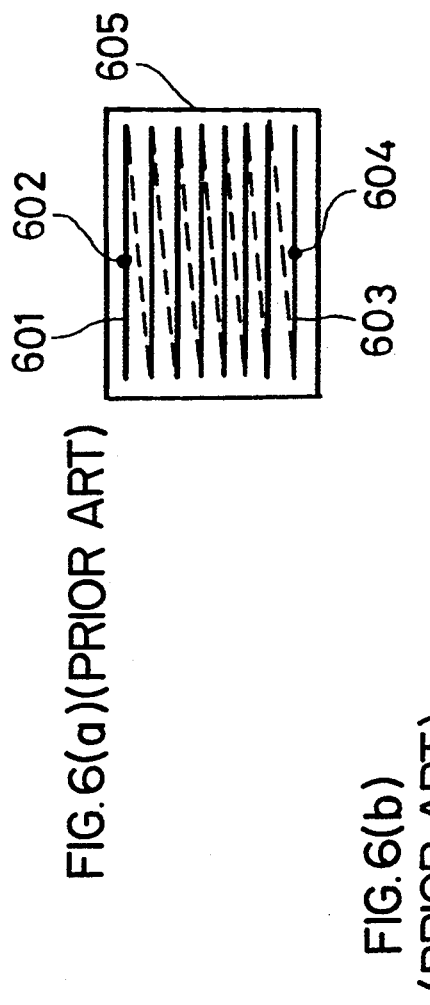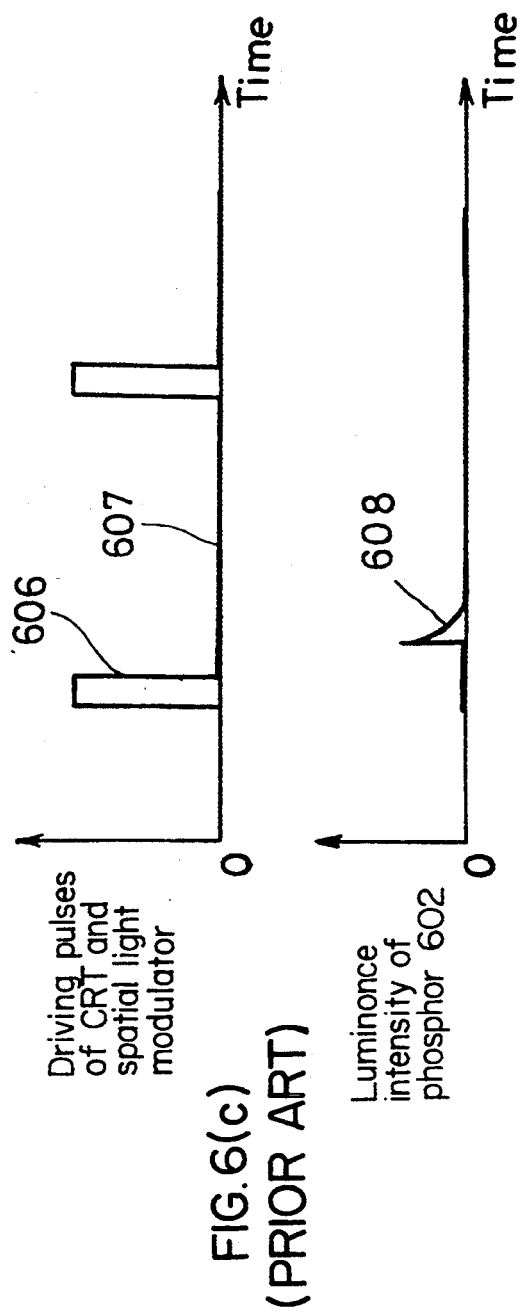
FIG.6(a)(PRIOR ART)
FIG.6(b) (PRIOR ART)
FIG.6(c) (PRIOR ART)

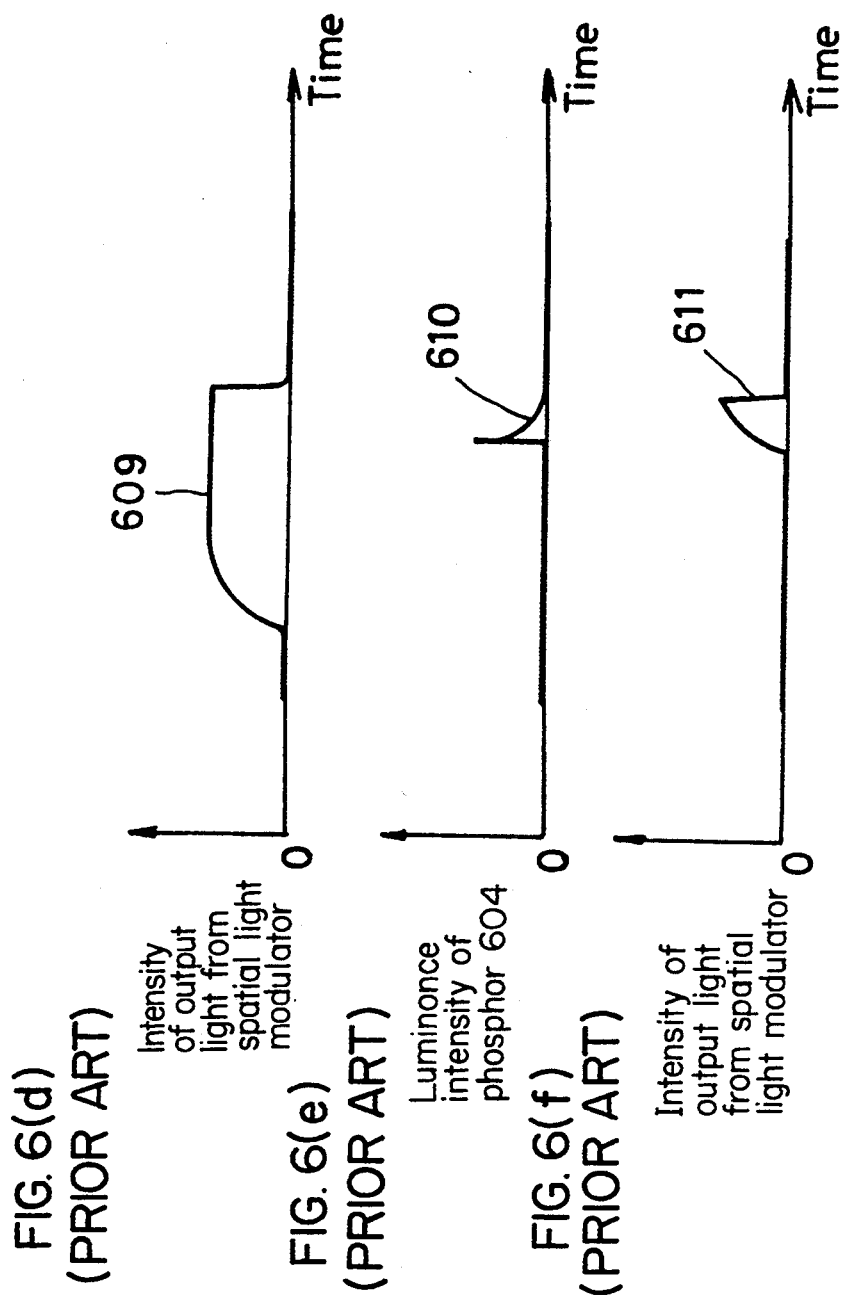

DRIVING METHOD FOR FERROELECTRIC LIQUID CRYSTAL SPATIAL LIGHT MODULATOR

FIELD OF THE INVENTION

The present invention relates to a driving method for a spatial light modulator which is to be used in a projection-type display, a holographic television set, an optical computer or the like.

BACKGROUND OF THE INVENTION

In the application of a spatial light modulator to a projection-type display apparatus or holographic television set, when information is written in the spatial light modulator by using a CRT, the driving pulses of the spatial light modulator are generally applied in synchronism with one frame cycle of the CRT. Such a driving method is reported, for example, in SID Digest (1991) Page 254–256. Timing charts for driving the CRT and spatial light modulator are shown in FIG. 2. In FIG. 2, time-chart (a) shows the driving pulses of the CRT; time-chart (b) shows the luminance intensity of a phosphor on the screen of the CRT; time-chart (c) shows the driving signals of the spatial light modulator; and time-chart (d) shows the intensity of the output light from the spatial light modulator. The spatial light modulator is driven by the driving signals 204 which are applied in synchronism with the driving pulses 201 of the CRT. One driving signal 204 consists of an erasing pulse 202 and a reading period 203. When a phosphor on the screen of the CRT outputs a writing light 205 at a time in the reading time 203 of the driving signal 204, the light is received by a photo-conductive layer of a pixel of the spatial light modulator, the pixel of spatial light modulator turns on and starts up outputting an output light 206. When the erasing pulse 202 is inputted to the spatial light modulator, the spatial light modulator turns off and the intensity of the output light 206 becomes zero. By repeating the above-mentioned actions, an image is observed on the spatial light modulator. This method has the merit that the duty ratio of the output light (total on time of the output light in one frame cycle) can be made larger even when a material having a short life is used as a phosphor, and thereby a bright image can be obtained from the spatial light modulator. Generally, when a large negative voltage is applied to the spatial light modulator, the spatial light modulator is turned on by an electric field generated by the negative voltage even when the writing light is not inputted thereto. However, the driving signals 204 have the wave forms shown in the time-chart (c) in FIG. 2, so they do not apply any large negative voltage to the spatial light modulator. Therefore, the spatial light modulator may not turned on by the electric field and the image contrast ratio of the image is not reduced so much. In addition, it is reported that half tone representation can be obtained by changing the luminance intensity of the phosphor on the CRT.

When the electric field applied on a ferroelectric liquid crystal is very high, ions are generated in the liquid crystal by polarization thereof. The ions are accumulated in the boundary of the ferroelectric liquid crystal and an alignment film. Therefore, a threshold voltage for switching the ferroelectric liquid crystal is varied by the amount of the accumulated ions. When the threshold voltage is changed, deterioration appears in the switching characteristics of the ferroelectric liquid crystal with repetition of the driving. For preventing the appearance of the deterioration of switching characteristics, the wave forms of the driving signal are generally made to be symmetrical with respect to the polarity of voltage. By such measures, the mean value of the displacement of the ion in the ferroelectric liquid crystal is made to be zero. And thereby, tolerance for the deterioration of the ferroelectric liquid crystal can be increased. An example that such driving signals are used for driving the spatial light modulator is described in, for example, Japanese Applied Physics 30 (1991) Page L386–L388. Examples of the driving signals are, for example, shown in FIGS. 3 and 4 of this application, as well. In FIG. 3, time-chart (a) shows the wave form of the driving signal of the spatial light modulator, and time-chart (b) shows the intensity of the output light from the spatial light modulator. As shown in the time-chart (a) in FIG. 3, the driving signals are formed to be repetitions of an erasing pulse 301 and a writing pulse 302, and these two pulses 301 and 302 have substantially the same width and absolute value as the voltage but their polarities are opposite to each other. When such driving signals are applied to the spatial light modulator, the output light is turned off without regard to the existence of the inputted light during the period of erasing pulse 301, and the output light is issued only when the inputted light exists during the period of writing pulse 302. Accordingly, the intensity of the output light 303 responding to the inputted light is shown by the time-chart (b) in FIG. 3. FIG. 4 shows another example of the driving signals. In FIG. 4, time-chart (a) shows the wave form of the driving signals of a spatial light modulator, and time-chart (b) shows the intensity of the output light from the spatial light modulator. As shown in time-chart (a) in FIG. 4, one driving signal consists of an erasing pulse 401, a first lower voltage period 402, a writing pulse 403 and a second lower voltage period 404. The erasing pulse 401 and writing pulse 403 have substantially the same width and absolute value as the voltage but their polarities are opposite to each other. Similarly, two lower voltage periods 402 and 404 have substantially the same width but their polarities are opposite to each other. In this example, when the erasing pulse 401 is inputted, the output light turns off without regard to the existence of the inputted light. And when the writing pulse 403 is inputted, the output light turns on only when the inputted light is present. A typical example of the intensity of the output light 405 responding to the driving signals shown in the time-chart (a) in FIG. 4 is shown in time-chart (b) in FIG. 4.

Still another example of the driving signals of the spatial light modulator is shown in FIG. 5. In FIG. 5, time-chart (a) shows the wave form of the driving-signals, and time-chart (b) shows the intensity of the output light from the spatial light modulator. As shown in the time-chart (a) in FIG. 5, one driving signal consists of an erasing pulse 501, a first lower voltage period 502, a writing pulse 503 and a second lower voltage period 504. In the above-mentioned examples shown in FIGS. 3 and 4, the duty ratio of the output light is at most 504. On the other hand, as shown in FIG. 5, by changing the widths of the first and second lower voltage periods 502 and 504, the duty ratio of the intensity of output light 505 can be made nearly equal 1. In such a method, the mean value of the intensity of the output light becomes larger and the contrast thereof is also increased. The driving signal becomes unsymmetrical to the time base, but the deterioration of the switching characteristics can be prevented even though the DC component of the driving signal averages out to be zero. In addition, a conductive material is-used as the alignment film, the deterioration of the switching characteristics can be further prevented.

In case of using the spatial light modulator for the projection-type display apparatus or holographic television set, the brightness of the screen is necessary to be completely uniform. It is, however, difficult to make the brightness of each part of the spatial light modulator completely uniform when the driving cycle of the spatial light modulator is completely in synchronism with the frame cycle of the CRT which is used as a writing means. Such a phenomenon is described referring to FIG. 6. In FIG. 6, plan view (a) shows the scanning lines 601, 603 on a screen 605; time-chart (b) shows the wave form of the driving signal of the CRT and the spatial light modulator; time-chart (c) shows luminance intensity of a phosphor 602 on the screen 605; time-chart (d) shows the intensity of the output light from a pixel of the spatial light modulator corresponding to the phosphor 602; time-chart (e) shows luminance intensity of a phosphor 604 on the screen 606; and time-chart (f) shows the intensity of the output light from a pixel of the spatial light modulator corresponding to the phosphor 604. Generally, the screen 605 of CRT is scanned by electron beams, the phosphor 602, 604 which are irradiated by the electron beam output pulses of light, and thereby, an image is formed on the screen 605. In case of scanning the electron beams on the CRT screen 605 from the up side to the down side, the phosphor 602 which is positioned on an upper scanning line 601 outputs the light in an earlier time in the frame cycle of the CRT. The phosphor 604 which is positioned on a lower scanning line 602 outputs the light later than the phosphor 602. As a result, when the reading time period 607 is made substantially equal to one frame cycle time of the CRT, the light pulses from the phosphors 602 and 604 are respectively shown by the wave forms designated by numerals 608 and 610 in the time-charts (c) and (e) in FIG. 6. And the intensities of the output lights from the pixels of the spatial light modulator responding to the light pulses 608 and 610 respectively become the wave forms designated by numerals 609 and 611 in the time-charts (d) and (f) in FIG. 6. Even though the intensities of the light pulses 608 and 610 are substantially the same, the mean value of the intensity of the output light 611 becomes smaller than that of the output light 609 in the same frame cycle. Accordingly, the output light 611 is felt darker than the output light 609 by human eyes, and it is felt that the upper left portion of the screen 605 is brighter and the lower right portion is darker. For the above-mentioned reasons, the brightness of the output image from the spatial light modulator in each part becomes inhomogeneous.

SUMMERY OF THE INVENTION

The objective of the present invention is to solve the above-mentioned problems and to provide an improved method for driving a spatial light modulator.

A driving method for a spatial light modulator in accordance with the present invention is constituted that:

the spatial light modulator has a configuration such that at least a photo-conductive layer with rectification and a ferroelectric liquid crystal layer provided between a pair of transparent electrodes and a side of the photo-conductive layer facing toward a light information inputting device or means, and plural units of a driving signal are applied between the transparent electrodes during each frame cycle of the light information inputting means.

The unit of driving voltage cycle consists of an erasing voltage time period and a writing voltage time period without interruption. Or, the unit of driving voltage cycle consists of an erasing voltage time period, a first lower voltage time period, a writing voltage time period and a second lower voltage time period.

When plural units of driving signals are applied to a spatial light modulator during one frame cycle of a CRT, writing and erasing of an information represented on the screen of the CRT are repeated during one frame cycle of the CRT. The writing of information to the spatial light modulator and intensity of output light from the spatial light modulator in each unit of the driving signal correspond to a sampled luminance intensity of each phosphor on the CRT screen at that time. When the cycle of a unit of the driving signal is sufficiently smaller than the damping time constant of luminance intensity of the phosphor on the CRT screen, an envelope which smoothly lines the dots in a graph of intensity values of the output lights from the spatial light modulator in each unit of the driving signal becomes substantially equal to the characteristic curve of the change of luminance intensity of the phosphor. This shows that an image formed on an output face of the spatial light modulator is substantially equivalent to the image directly displayed on the CRT screen. Therefore, the intensity of the output light at any position on the output face of the spatial light modulator is entirely uniform.

BRIEF DESCRIPTION OF THE DRAWINGS

FIG. 1 is a wave form illustration by means of time-charts, wherein (a) shows intensity of electron beams in a CRT; (b) shows luminance intensity of a phosphor on the CRT screen; (c) shows driving signals of a first preferred embodiment for driving a spatial light modulator; (d) shows intensity of output light from the spatial light modulator; (e) shows driving signals of a second preferred embodiment for driving the spatial light modulator; and (f) shows intensity of output light from the spatial light modulator in a driving method for a spatial light modulator in accordance with the present invention.

FIG. 2 is a waveform illustration by means of time-charts, wherein (a) shows the driving pulses of the CRT; (b) shows the luminance intensity of the phosphor on the CRT screen; (c) shows the driving signals of the spatial light modulator; and (d) shows the intensity of the output light from the spatial light modulator in a conventional driving method for a spatial light modulator.

FIG. 6(a) is the drawing showing the electron beam scanning on the CRT screen and time-charts at that time, wherein (a) schematically shows the scanning lines on the CRT screen 605; (b) shows the driving pulses of the CRT; (c) shows the luminance intensity of the phosphor 602; (d) shows the intensity of the output light from the pixel of the spatial light modulator corresponding to the phosphor 602; (e) shows the luminance intensity of the phosphor 604; and (f) shows the intensity of the output light from the pixel of the spatial light modulator corresponding to the phosphor 604.

DETAILED DESCRIPTION OF THE INVENTION

Figure 3A:
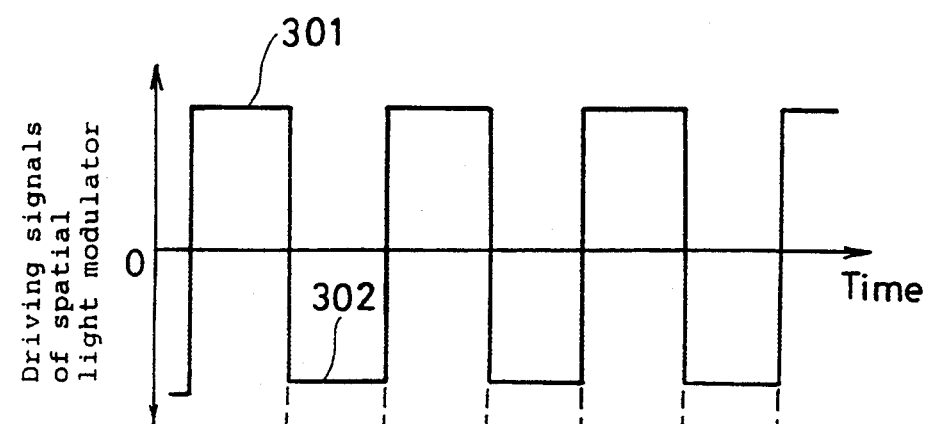
FIG. 3 is a waveform illustration by means of time-charts, wherein (a) shows the driving signals of the spatial light modulator and (b) shows the intensity of the output lights from the spatial light modulator in another conventional driving method for a spatial light modulator.
Figure 3B:
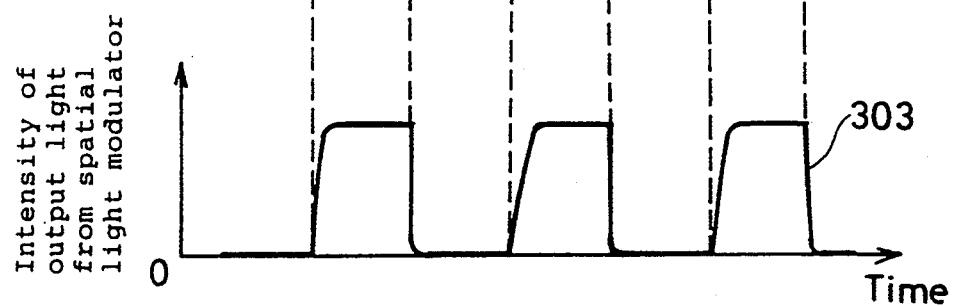
Figure 4A:
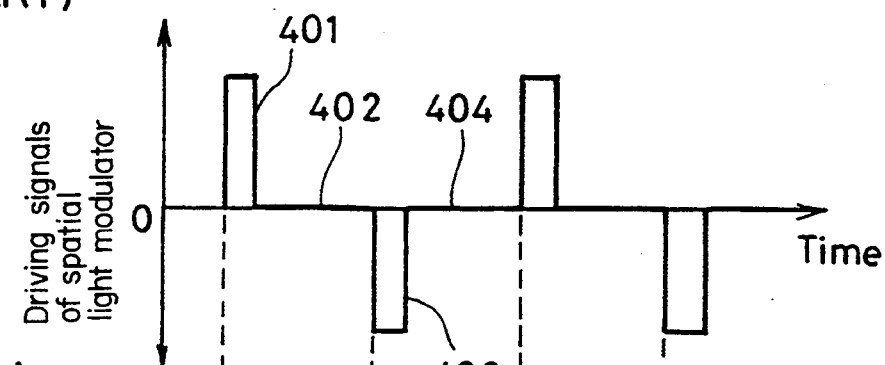
FIG. 4 is a waveform illustration by means of time-charts, wherein (a) shows the driving signals of the spatial light modulator and (b) shows the intensity of the output lights from the spatial light modulator in still another conventional driving method for a spatial light modulator.
Figure 4B:
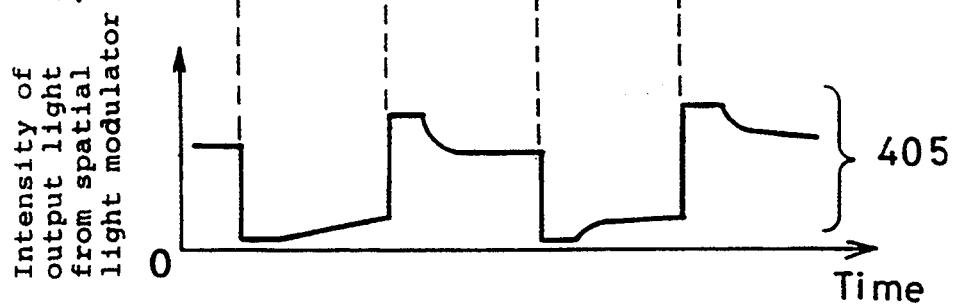
Figure 5A:
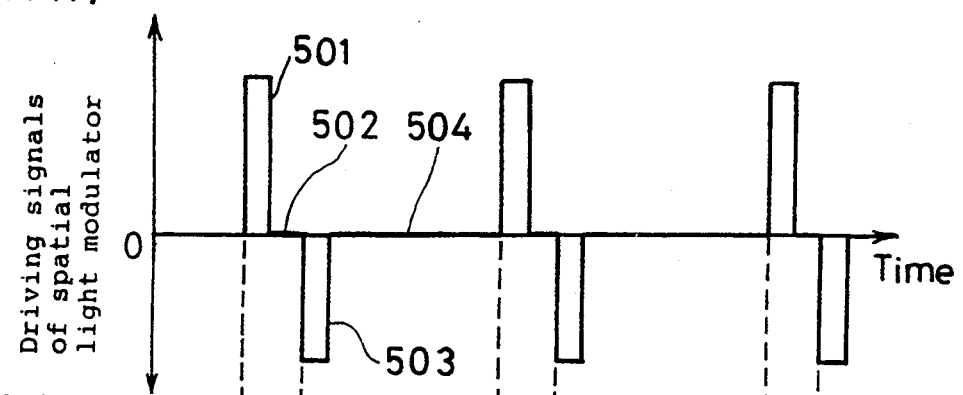
FIG. 5 is a waveform illustration by means of timecharts, wherein (a) shows the driving signals of the spatial light modulator and (b) shows the intensity of the output light from the spatial light modulator in still a further conventional driving method for a spatial light modulator.
Figure 5B:
Figure 7:
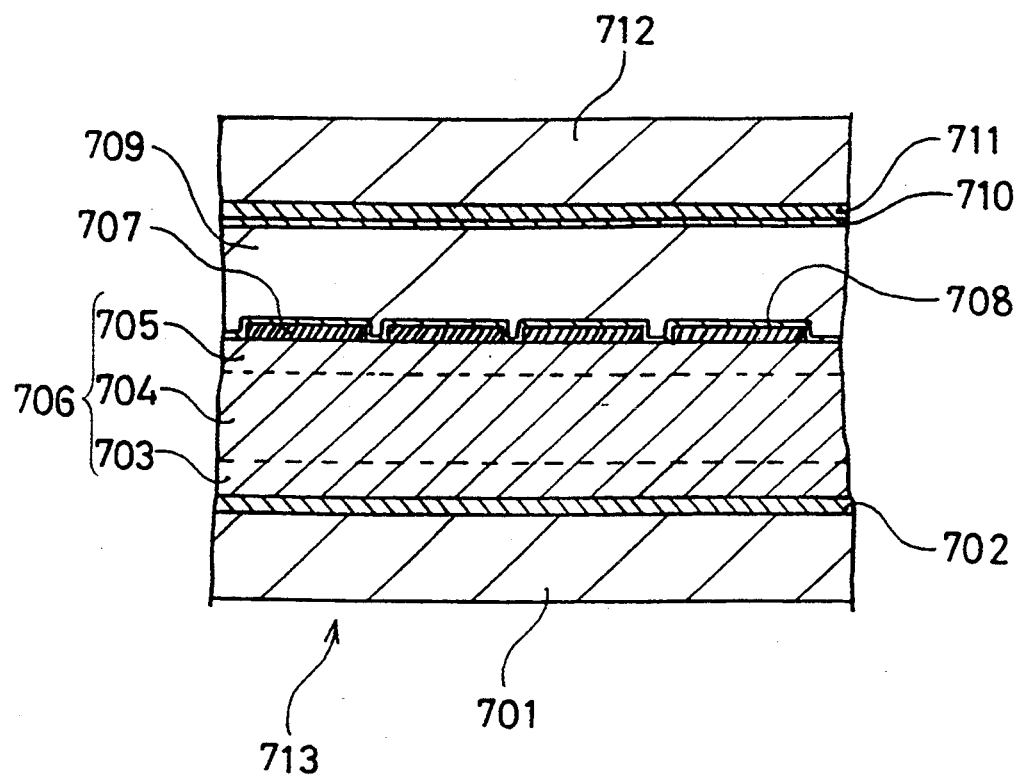
FIG. 7 is a cross-sectional view showing an embodiment of a spatial light modulator driven by the driving method in accordance with the present invention.

The configuration of a spatial light modulator driven by the driving method in accordance with the present invention is described referring to FIG. 7. As shown in FIG. 7, the spatial light modulator 713 comprises: a transparent electrode 702 (which is made of, for example, ITO, ZnO, SnO$_2$, or the like) formed on a transparent substrate 701 (which is made of, for example, glass or the like); a photo-conductive layer 706 with rectification formed on the transparent electrode 702; plural metal reflection film pixels 707 which are respectively independent from each other ((and made of, for example, Al, Ti, Cr, Ag, or lamination of at least two kinds of metals) formed on the photo-conductive layer 706; an alignment film 708 (which is made of, for example, high polymer film of polyimide or the like) formed on the metal reflection film pixels 707 for making a liquid crystal orient; another transparent electrode 711 (which is made of, for example, ITO, ZnO, SnO$_2$ or the like) formed on another substrate 712 (which is made of, for example, glass or the like); another alignment film 710 (which is made of, for example, high polymer film of polyimide or the like) spread on the transparent electrode 711; and a ferroelectric liquid crystal 709 filled between the alignment films 708 and 710. A part of the substrate 712, transparent electrode 702, photo-conductive layer 706, metal reflection film 707 and film 708 and another part of the substrate 712, transparent electrode 711 and film 710 are formed independently from each other. These two parts are fixed with a predetermined gap, and finally the ferroelectric liquid crystal 709 is filled in the gap.

The materials which can be used for the photo-conductive layer 706 are, for example: compound semiconductors of CdS, CdTe, CdSe, ZnS, ZnSe, GaAs, GaN, GaP, GaAlAs, InP or the like; amorphous semiconductors of Se, SeTe, AsSe or the like; or organic semiconductor of (1) phthalocyanine pigments (which is abbreviated as Pc) of Pc not including metal, XPc (X=Cu, Ni, Co, TiO, Mg, Si(OH)$_2$ or the like), AlClPcCl, TiOClPcCl, InClPcCl, InClPc, InBrPcBr or the like, (2) azo system pigments such as monoazo pigment, disazo pigment, (3) perylene pigments such as perylenic acid anhydride, perylenic imide or the like, (4) indigoid dyes, (5) quinacridone pigments, (6) polynuclearquinone such as anthraquinone or pyrenequinone, (7) cyanine dyes, (8) xanthene dye, (9) charge-transfer complexes such as PVK/TNF, (10) eutetic complex formed by pyrylium salt and polycarbonate resin, (11) azulenium salt compounds, or the like. In case of using amorphous Si, Ge, Si1-xCx, Si1-xGex, Ge1-xCx (hereinafter, abbreviated as a-Si, a-Ge, a-Si1-xCx, a-Si1-xGex, a-Ge1-xCx) for the photo-conductive layer 706, hydrogen or halogen can be included therein. In addition, oxygen or nitrogen can be included for decreasing dielectric constant or increasing electrical resistivity. For controlling the electrical resistivity, p-type impurities of B, Al, Ga or the like, or n-type impurities of P, As, Sb or the like can be added. Such an amorphous material to which the impurity is added can be laminated to form a junction of p/n, p/i, i/n, p/i/n or the like, and thereby, a depletion layer is formed in the photo-conductive layer for controlling the dielectric constant and dark resistivity or polarity of operating voltage of the photo-conductive layer. Furthermore, not only the amorphous material, but also at least two other materials recited above can be laminated for forming a heterojunction structure in a manner to form the depletion layer in the photo-conductive layer. The thickness of the photo-conductive layer 706 is preferred to be from 0.1 to 10 μm.

An embodiment of method for manufacturing the spatial light modulator as configured above is described below. First, ITO thin film for the transparent electrode 702 is piled on a glass substrate 701 (which has dimensions of 40 mm×40 mm×1 mm) by sputtering. The thickness of the ITO film is about 1,000 angstroms. Next, pin structure amorphous silicon (a-Si: H) for the photo-conductive layer 706 is piled on the transparent electrode 702 by plasma CVD method. thicknesses of p-layer 703, i-layer 704 and n-layer 705 are respectively 1,000 angstroms, 17,000 angstroms and 2,000 angstroms, and total thickness of them is selected to be 2 μm. In a material of p-layer 703, B (boron) is added in the amount of 400 ppm. And in the material of n-layer, P (phosphorus) is added in the amount of 400 ppm. In a material of i-layer 704, nothing is added. Next, Cr film is formed on the entire surface of photo-conductive material 706 for forming metal reflection film pixels 707 by vacuum evaporation. After that, the Cr film is divided into minute pixels by photo-lithography. At this time, the size of each metal reflection film pixel 707 is 23 μm×23 μm, and the gap between each pixel is 2 μm. Numbers of pixels are $1 \times 10^6$ (1,000×1,000). Polyamic acid is spread on the metal reflection film pixels 707 by a spin coat method, and the spread polyamic acid is hardened by heating. As a result, the polyimide alignment film 708 is formed. Thickness of the polyimide film is 100 angstroms. Orientation of the polyimide film 708 is generated by rubbing in one way by a nylon cloth. Another ITO transparent electrode 711 is similarly formed on another (glass) substrate 712, and another polyimide alignment film 710 is formed thereon and oriented. Furthermore, beads having a diameter of 1 μm are inlaid on the substrate 712 and fixed to the other substrate 701. Thereby, a gap of 1 μm is formed between both substrates 701 and 712. Finally, a ferroelectric liquid crystal 709 is filled in the gap, and the liquid crystal is heat treated. As a result, the spatial light modulator 713 is completely made.

Figure 8:
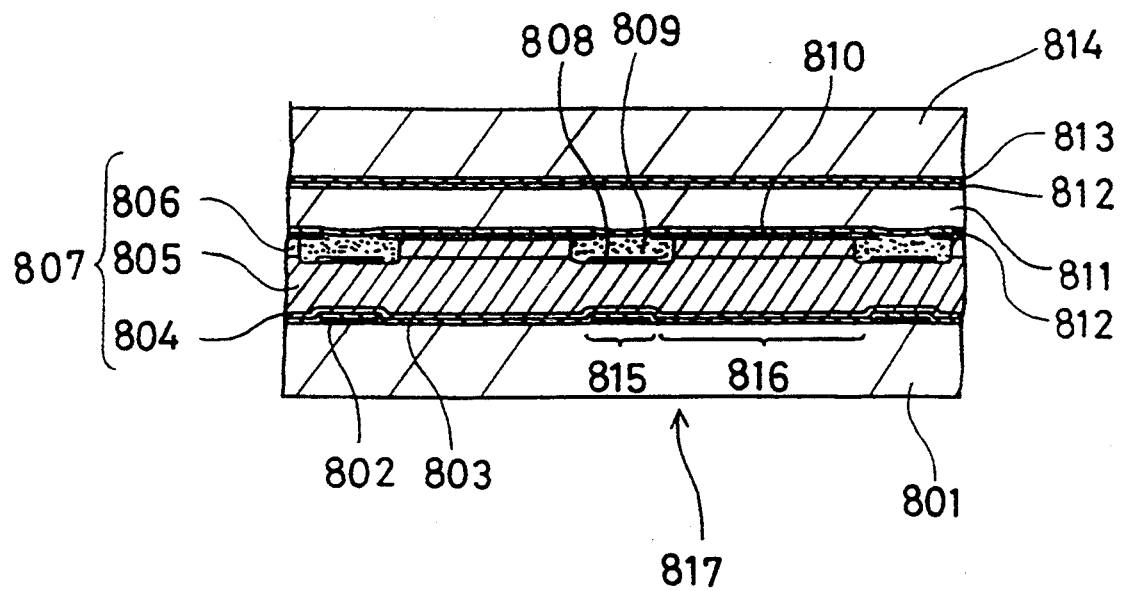
FIG. 8 is a cross-sectional view showing another embodiment of a spatial light modulator driven by the driving method in accordance with the present invention.

Another configuration of a spatial light modulator driven by a driving method in accordance with the present invention is described referring to FIG. 8. In FIG. 8, the spatial light modulator 817 is made in the following manner: a transparent electrode 803 formed on a transparent substrate 801; a photo-conductive layer 807 with rectification is formed on the transparent electrode 803 and includes a p-layer 804, an i-layer 805 and an n-layer 806; plural metal reflection films 810 which are respectively independent from each other are formed on the photo-conductive layer 807; a film 812 with an oriented structure is formed on the metal reflection film 810 for making a liquid crystal orient; another transparent electrode 813 is formed on another substrate 814; another alignment film 812 is spread on the transparent electrode 813; and a ferroelectric liquid crystal 811 is filled between the alignment films 812. Furthermore, a part designated by numeral 816 corresponds to a pixel of the spatial light modulator and a part designated by numeral 817 is a separation between the pixels. The spatial light modulator configured as shown in FIG. 8 has essentially the same configuration of that shown in FIG. 7, but has the following differences.

(1) An input shield film 802 for shielding input light which is made of metal such as Cr, Al, Ti, Ag or the like is formed between substrate 801 and transparent electrode 803. Therefore, reduction of resolution due to the occurrence of crosstalk between the pixels caused by reducing the electric resistance of the separators between the pixels can be prevented.

(2) A gap is formed between adjoining metal reflection film pixels 810 by eliminating all n-layer 806 and i-layer 805 therein. Therefore, the adjoining metal reflection film pixels 810 are not connected by n-layer which has a low electrical resistance, and are then electrically isolated. As a result, the resolution of the spatial light modulator is increased.

(3) An output shield film 808 which is made of metal such as Al. Cr, Ti, Ag or the like is formed on the bottom of the above-mentioned gap. Therefore, switching malfunction due to leakage of reading light to the photo-conductive layer 807 is prevented, As a result, the intensity of reading light can be increased.

(4) An organic light shield film 809 is filled in the gap. Therefore, the shielding of the reading light is further improved.

Still another spatial light modulator (not shown in the figure) having a configuration that a conductive reflection film is entirely formed instead of the metal reflection film pixels 707 in FIG. 7 is usable.

Principles of the driving method for driving the spatial light modulator in accordance with the present invention are described below referring to FIG. 1. In FIG. 1, time-chart (a) shows the intensity of electron beams of the CRT; time-chart (b) shows the luminance intensity of phosphors on the CRT screen; time-chart (c) shows the wave form of a first preferred embodiment of driving signals for driving the spatial light modulator; time-chart (d) shows the intensity of output light from the spatial light modulator driven by the driving signals in the first embodiment; time-chart (e) shows the wave form of a second preferred embodiment of driving signals for driving the spatial light modulator; and time-chart (f) shows the intensity of output light from the spatial light modulator driven by the driving signals in the second embodiment. At first, a unit of a driving signal 107 shown in the time-chart (c) in FIG. 1 is used as a driving signal. Such driving signals as shown in time-chart (c) in FIG. 1 have repetition of the erasing pulse 105 and reading period (or writing period) 106. When the erasing pulse 105 is inputted into a spatial light modulator wherein the photo-conductive layer with rectification and the ferroelectric liquid crystal are connected in series, the photo-conductive layer is forward-biased to be lower resistivity state. Therefore, the ferroelectric liquid crystal is forcibly turned off. In the reading period 106 having a lower (negative) voltage, the photo-conductive layer is reverse-biased. Since a photocurrent in proportion to the intensity of the inputted light is generated in the photo-conductive layer, electric charge is stored on the boundary of the ferroelectric liquid crystal and photo-conductive layer. Then, the polarization of the ferroelectric liquid crystal turns over for discharging the stored electric charge. When quantity of the stored electric charge is designated by Q and the polarization of the ferroelectric liquid crystal is designated by P, there is a relation of P=Q between them. When the intensity of polarization of the ferroelectric liquid crystal is $P_0$, the polarization generally takes the two stable values of $P=+P_0$ or $P=-P_0$. However, when the quantity of the stored electric charge Q is stably controlled in a range of $-P_0 < Q < +P_0$, an intermediate polarization of the ferroelectric liquid crystal can be realized stably. It is considered that such intermediate polarization is realized by distribution of $+P_0$ state and $-P_0$ state in the liquid crystal or that the intermediate polarization is a transient state of turning the polarization of the liquid crystal. In this embodiment, since the intensity of output light from the spatial light modulator can be controlled by the quantity of photocurrent or intensity of the inputted light to the spatial light modulator, the half tone representation of an image on an output face of the spatial light modulator can be realized.

It is generally known that even when the inputted lights is not present, the spatial light modulator is turned on by an electric field generated by a large negative voltage applied to the spatial light modulator. As a result, the contrast of the image decreases. However, since the unit of driving signal 107 does not include any large negative voltage, the contrast of the image formed on the output face of the spatial light modulator does not decrease. Furthermore, when the width of the erasing pulse 105 in the unit of driving signal 107 is made sufficiently narrow, the ratio of on state time of the spatial light modulator in the unit of driving signal 107 becomes large (that is, the duty ratio becomes large), and the time-averaged value of the output light 109 shown in the time-chart (6) in FIG. 1 also becomes larger.

In addition, the second preferred embodiment of the unit of driving signals 114 shown in time-chart (e) in FIG. 1 can be used as driving signals for driving the spatial light modulator. The unit of the driving signal 114 consists of an erasing pulse 110, a first lower voltage period 111, a writing pulse 112 and a second lower voltage period 113. The unit of the driving signals 114 is considered as being formed by a writing pulse which is added over the driving pulse unit 107 shown in time-chart (c) in FIG. 1. Since the driving pulse unit 114 is symmetrical with respect to the voltages, the mean value of the displacement of the ions becomes zero, even when the ions are generated in the liquid crystal by the high electric field. Furthermore, since the electric charge is not stored in the boundary of the liquid crystal and the alignment film, the threshold voltage of the liquid crystal does not change and the contrast of the image formed on the output face of the spatial light modulator does not change as time passes. As a result, the spatial light modulator can be driven stably. Still more, when the width of the second lower voltage period 113 is made wider than that of the first lower voltage period 111, the duty ratio of the output light becomes larger and thereby the contrast of the image also becomes larger.

Next, how the entirely bright image can be obtained by the present invention is described below. Time-chart (a) in FIG. 1 shows the intensity of electron beam 103, time-chart (b) shows the luminance intensity of the phosphor 104 on the CRT screen, time-charts (c) and (e) show the wave forms of the driving signals 108 and 115, and time-charts (d) and (f) show the intensities of the output lights 109 and 116 from the spatial light modulator. Since the electron beams are scanned on the CRT screen, the electron beams reach a pixel on the CRT screen at interval of one frame cycle 102 of the CRT. At this time, the intensities of the electron beams 103 are in proportion to the brightness of a pixel of an image to be displayed in the CRT screen on the frame. Accordingly, the electron beams 103 having different intensities 101a, 101b, 101c . . . continuously reach each pixel at predetermined intervals. The phosphor on the CRT screen emits light with a luminance in proportion to the intensity of the electron beam 103 reaching it, and the intensity of emitted light from the phosphor damps with a predetermined time constant. Therefore, characteristic curves of the luminance intensity of the phosphor 104 shown in time-chart (b) in FIG. 1 can be obtained.

When the spatial light modulator is driven by plural units of driving signals 107 in one frame cycle 102 of the CRT, the intensity of output light 109 in each unit of driving signal 107 is in proportion to the luminance intensity of phosphor 104 at that time. As a result, the brightness of the image felt by human eyes, that is the mean value of output light 109 in one frame cycle 102 attains a value substantially in proportion to the luminance intensity of phosphor 104. Therefore, an image of high-fidelity can be reproduced on the spatial light modulator. When the number of units of driving signals 107 contained in one frame cycle 102 is made larger, the envelope which lines the peaks of the intensity of output lights 109 in respective units of driving signal 107 shown in the time-chart (d) in FIG. 1 becomes closer to the shape of the luminance intensity of phosphor 104 as shown in time-chart (b) in FIG. 1. As a result, the intensity of the output light 109 does not depend on the time difference between the driving signals 108 and the intensity of electron beam 103. In other word, even though the electron beams 103 having different intensities 101a, 101b, 101c . . . are inputted at any time in the driving signals 108, the mean value of the output light 109 in one frame cycle 102 does not change so much. This means that the brightness of the output image from the spatial light modulator becomes uniform, since the intensity of output light 109 can be obtained with the same sensitivity against the intensity of the electron beams 103 at any part on the spatial light modulator.

FIRST EXPERIMENT

Figure 9:
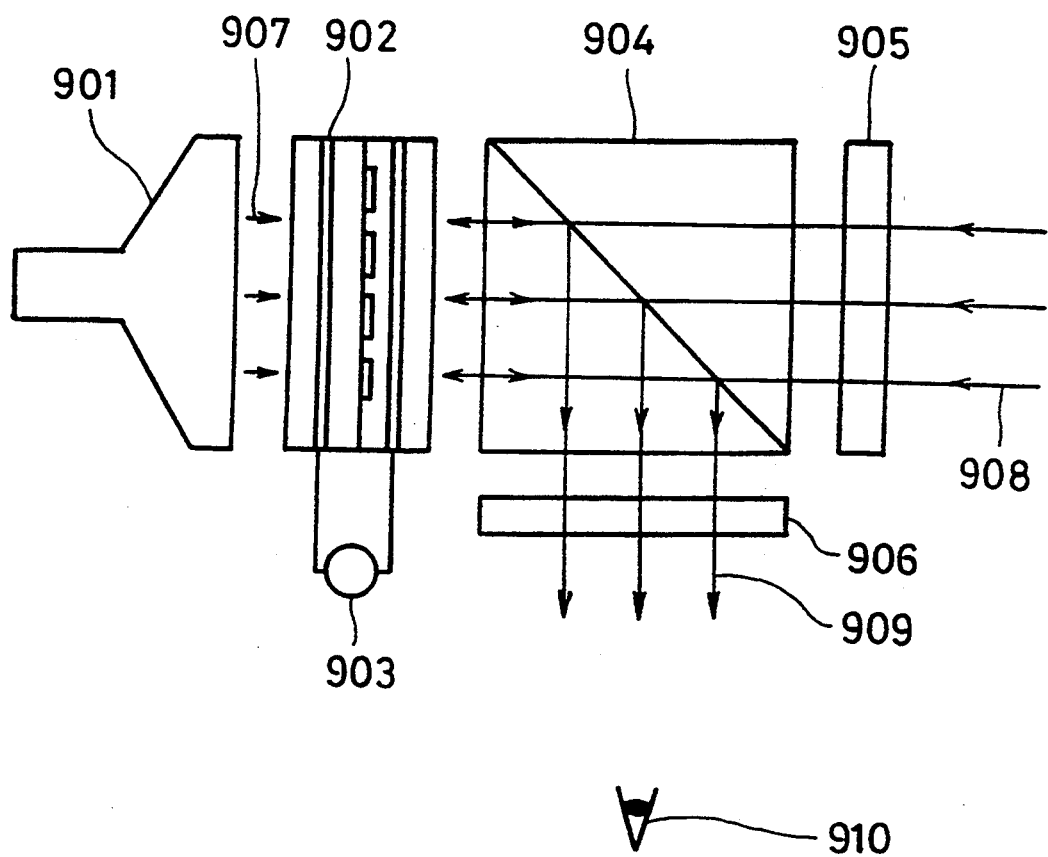
FIG. 9 is a schematic drawing showing an optical system for evaluating a spatial light modulator driven by the driving method in accordance with the present invention.

An optical system including the above-mentioned spatial light modulator and a CRT which serves as an optical writing means is described referring to FIG. 9. As shown in FIG. 9, the optical system comprises a CRT 901, a spatial light modulator 902, a driving source 903 for driving the spatial light modulator, a beam splitter 904, a polarizer 905 and an analyzer 906. An input light 907 corresponding to an image from the CRT 901 is written in the spatial light modulator 902 from the photo-conductive layer side. And the image is read out by the reading light 908 which is inputted through the analyzer 905 and beam splitter 904. The transmitting axes of the polarizer 905 and the analyzer 906 are perpendicular to each other. The spatial light modulator 902 is oriented in a manner so that it takes an extinctive position when the ferroelectric liquid crystal is off state. As the spatial light modulator 902, one having a configuration shown in FIG. 8 is used. It does not necessary whether the pitch of the pixels of CRT 901 is identical to, or different from the pitch of the pixels of the spatial light modulator 902. In this experiment, a CRT having 525 scanning lines with 50μ pixel pitch is used. For clearly focusing the image of the CRT 901 on the spatial light modulator 902, an image-forming optical system such as a single lens or SELFOC (trade mark of Nippon Sheet Glass Company, Limited) lens array can be inserted between them. As a-light source for reading light 908, a halogen lamp is used.

Since one frame cycle of the CRT 901 is 16.7 msec, the driving cycle of the spatial light modulator 902 is made shorter than the frame (for example, 1 msec). The CRT 901 and spatial light modulator 902 can be driven independently without synchronization at all, or they can be driven with synchronization in a manner so that a trigger pulse is generated and issued to the CRT 901 for every several driving pulses (for example, 16 pulses) of the spatial light modulator 902. In this optical system, the former is adopted.

The spatial light modulator 902 was driven by using the driving signals 108 including many units of driving signal 107 shown in time-chart (c) in FIG. 1 for reproducing the moving images on the CRT 901, and the output light from the spatial light modulator 902 was observed. In one unit of driving signal 107, a width of the erasing pulse 105 was 0.1 msec and its voltage was +10 V; the width of reading period 106 was 1.1 msec and its voltage was −0.91 V. In this case, one frame cycle of the CRT was 1.2 msec. The output light from the spatial light modulator 902 was directly observed through the beam splitter 904 by an observer 910. As a result of the observation, it was found that-the images displayed on the CRT screen has been faithfully reproduced on the output face of the spatial light modulator 902. The brightness of the reproduced image has been entirely uniform on the output face of the spatial light modulator. Furthermore, half-tone image has been also reproduced faithfully. Furthermore, a high contrast image could be obtained even though the intensity of the reading light 908 was about $1 \times 10^6$ lx. At this time, the contrast ratio was 100:1. No residual image of the moving image was observed on the output face of the spatial light modulator 902. Since a stable high-conductive polyimide was used for the alignment film of the liquid crystal of spatial light modulator 902, the quality and brightness of the output image from the spatial light modulator have not been changed, even when it has been driven repetitiously for several hours.

In addition, the spatial light modulator shown in FIG. 7 has also been used in the afore-mentioned optical system shown in FIG. 9 and the optical system has been driven similarly. In this case, since the shielding of the reading light 908 was not sufficient, the brightness of the image was restricted to $1 \times 10^3$ lx. However, the other results have been substantially the same as those of the above-mentioned case of using the spatial light modulator shown in FIG. 8.

SECOND EXPERIMENT

The driving signal 115 including a lot of units of driving signals 114 shown in the time-chart (e) in FIG. 1 has been used for driving the afore-mentioned optical system shown in FIG. 9. In the unit of driving signal 114, the width of erasing pulse 110 was 0.1 msec and its voltage was +10 V; the width of the first lower voltage period 111 was 0.1 msec and its voltage has been 0 V; the width of writing pulse 112 was 0.1 msec and its voltage was −10 V; and the width of the second lower voltage period 113 was 0.9 msec and its voltage was 0 V. As a spatial light modulator, one having a configuration shown in FIG. 8 was used. In this case, the image on the CRT 901 was faithfully reproduced so as to have brightness entirely uniform on the output face of the spatial light modulator 901. Furthermore, half-tone representation of the image was also reproduced and the residual image of the moving image was been observed on the output face of the spatial light modulator 901. The intensity of the output light from the spatial light modulator could have been increased to $1 \times 10^6$ lx. However, the phenomenon of switching the ferroelectric liquid crystal by the electric field due to the writing pulses 112 contained in the driving signals 115 occurred in this case, so that the contrast of the image on the output face of the spatial light modulator was inferior to that of the above-mentioned first experiment, and the contrast ratio was 80:1. However, the reproduced image was fit for observation. Since the driving signals 115 were symmetrical with respect to the polarity of the voltages, the stability of the spatial light modulator was improved even when the spatial light modulator has been continuously driven for dozens or so hours.

In addition, the spatial light modulator shown in FIG. 7 has also been used in the afore-mentioned optical system shown in FIG. 9 and driven similarly. In this case, the brightness of the image has been restricted to $1 \times 10^3$ lx similar to the case of the first experiment. With respect to the other matters, the results obtained have been similar to the case where the spatial light modulator shown in FIG. 8 has been used.

THIRD EXPERIMENT

Figure 10A:
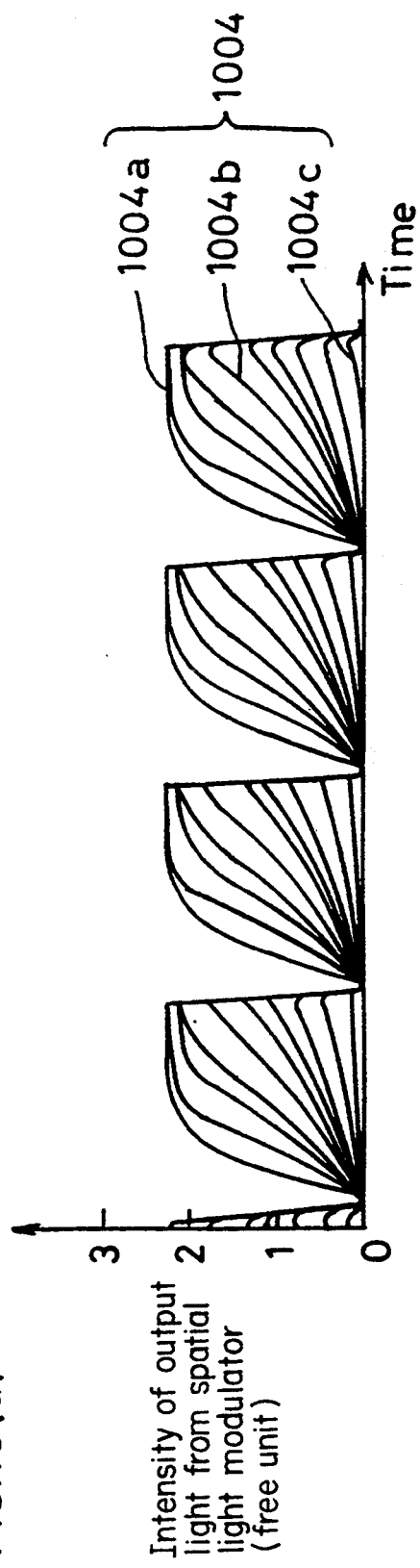
FIGS. 10(a) and 10(b) are waveforms illustration showing the relation between an embodiment of driving signals of a spatial light modulator and the intensity of output light from the spatial light modulator responding to the driving signals.
Figure 10B:
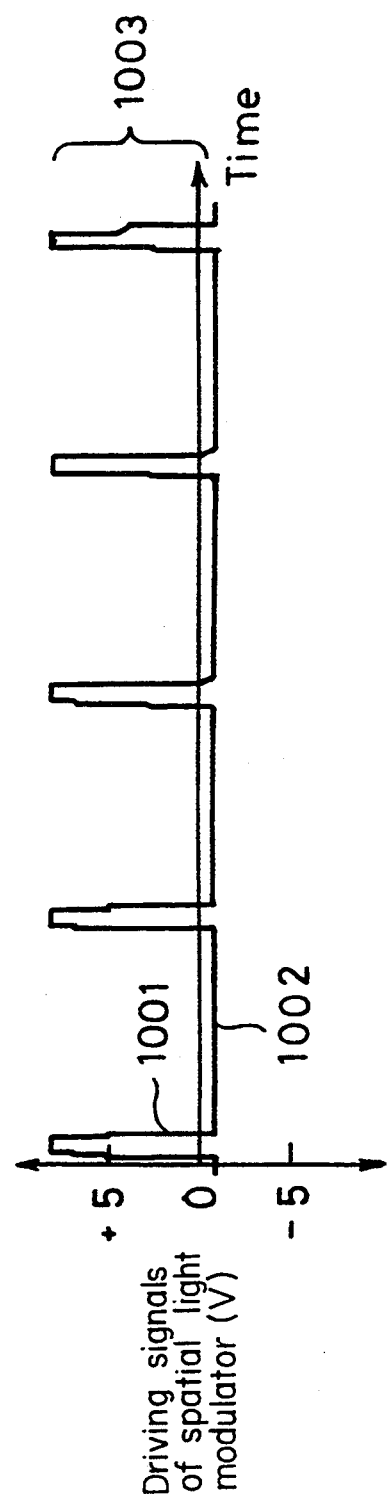

The following experiment has been executed for examining the half-tone representation of the spatial light modulator. A halogen lamp was used for inputting the information to the spatial light modulator instead of the CRT. We measured how the intensity of the output light against the writing light changed. For watching how the liquid crystal had switched responding to the driving signals, the waveform of the driving signals and change in the reading light intensity responding thereto was observed by oscilloscope. The observation result is shown in FIG. 10. In time-chart (a) in FIG. 10, characteristic curves show the changes in the intensities of output light from the spatial light modulator when the spatial light modulator 817 shown in FIG. 8 was driven by the driving signals 108. The driving signals 108 were substantially the same as those in the afore-mentioned first experiment. In time-chart (a) in FIG. 10, the characteristic curve designated by numeral 1004a is a case of using a writing light having an intensity of 3000 $\mu$W/cm$^2$, the characteristic curve designated by numeral 1004b is a case of using a writing light having an intensity of 500 $\mu$W/cm$^2$, and the characteristic curve designated by numeral 1004c is a case of using no writing light. From FIG. 10, it is found that when the intensity of the writing light is increased, the start up of the output light 1004 in the reading period 1002 becomes steep and mean value of the intensity of output light also becomes larger. In time-chart (b) in FIG. 10, the driving signal 1003 includes a erasing pulse 1001 and a reading period 1002. This shows that a photocurrent in proportion to the intensity of writing light has been generated on the photo-conductive layer during the reading period 1002, that electric charge has been stored on the boundary of the ferroelectric liquid crystal and photo-conductive layer, and that the liquid crystal has gradually turned the polarization for balancing the quantity of the stored charge. As a result, the half-tone representation of the spatial light modulator could be obtained.

Figure 11A:
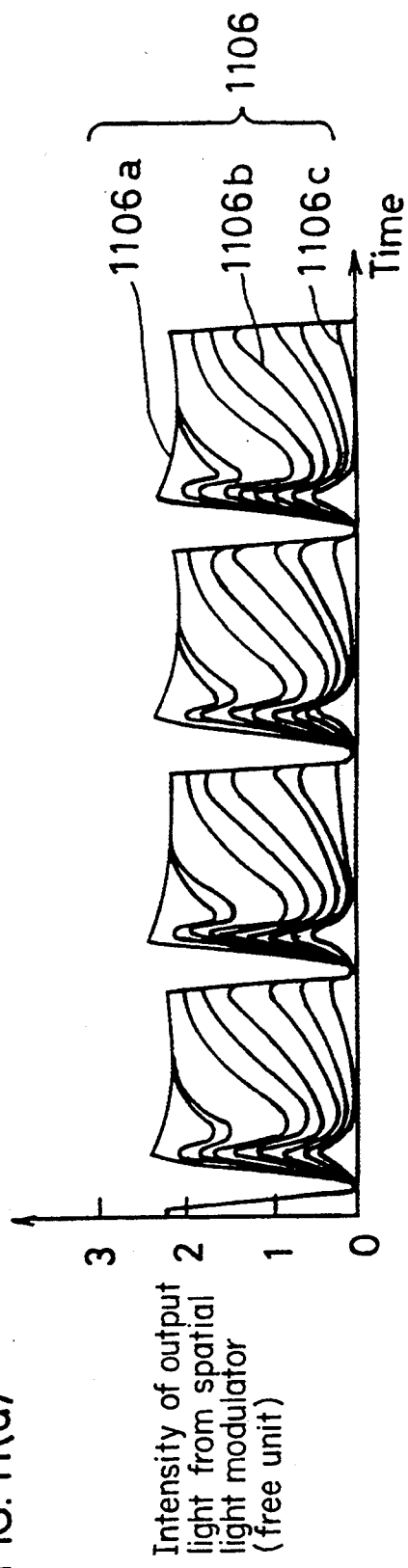
FIGS. 11(a) and 11(b) are waveforms illustration showing the relation between another embodiment of driving signals of a spatial light modulator and the intensity of output light from the spatial light modulator responding to the driving signals.
Figure 11B:
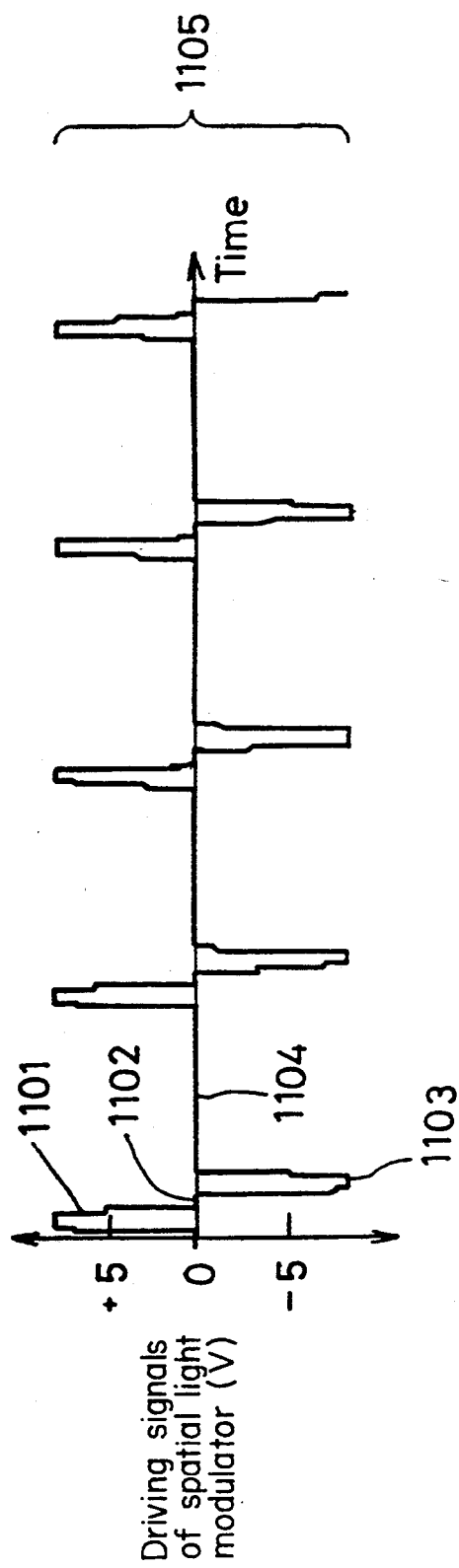

In addition, the driving signals 115 have been used for another experiment of examining the half-tone representation of the spatial light modulator. The result of the experiment is shown in FIG. 11. In time-chart (a) in FIG. 11, the characteristic curve designated by numeral 1106a is a case of using a writing light having an intensity of 3000 $\mu$W/cm$^2$, the characteristic curve designated by numeral 1106b is a case of using a writing light having an intensity of 500 $\mu$W/cm$^2$, and the characteristic curve designated by numeral 1106c is the case of using no writing light. In time-chart (b) in FIG. 11, the driving signals 1105 include an erasing pulse 1101, a first lower voltage period 1102, a writing pulse 1103 and a second lower voltage period 1104. FIG. 11 shows that the half-tone representation can be obtained by changing the intensity of the writing light. Even when the writing light has been zero, a small peak appeared on the characteristic curve shown by numeral 1106c. This is due to the switching of the ferroelectric liquid crystal caused by the writing pulse 1103 with high negative voltage.

Figure 12:
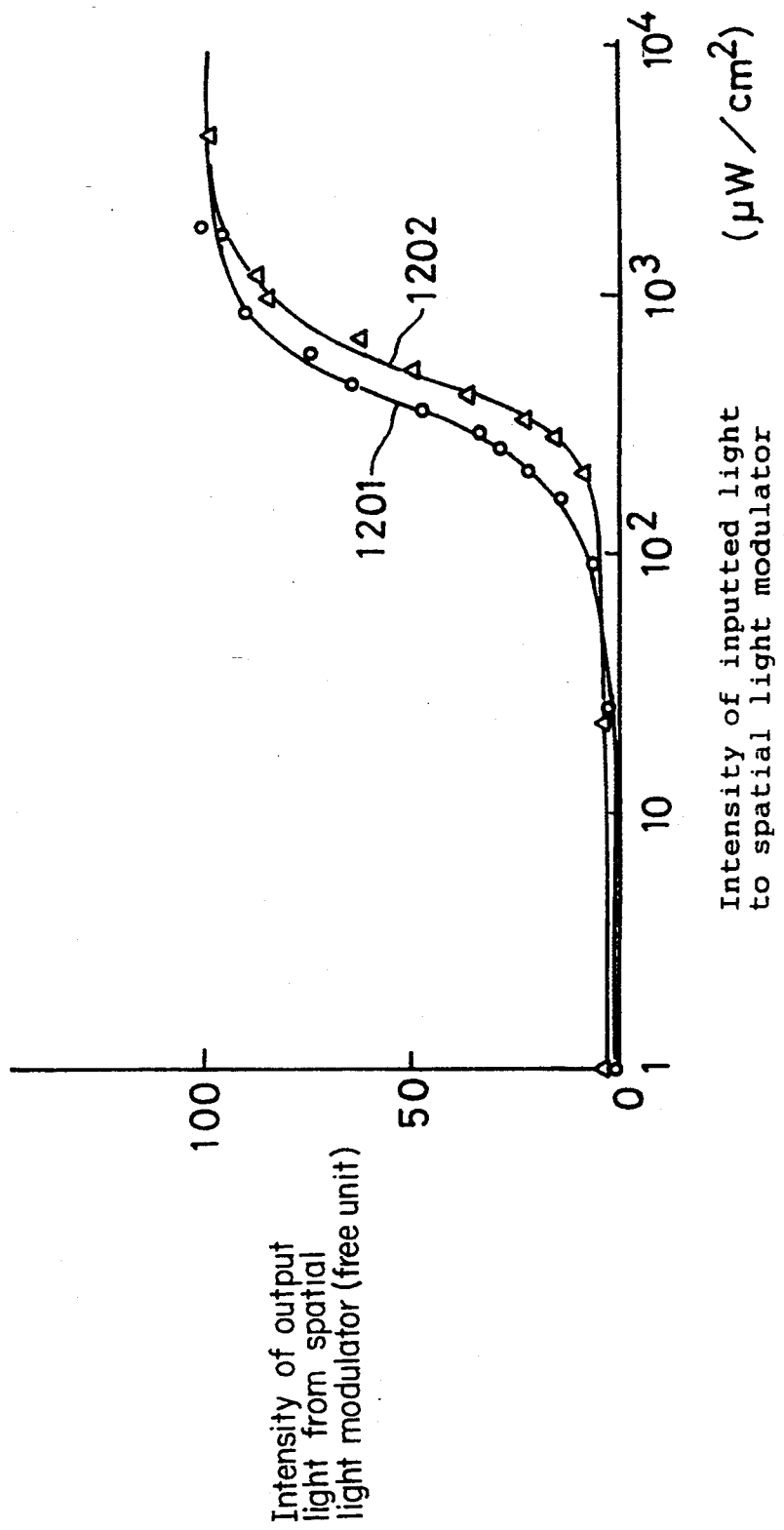
FIG. 12 is a drawing showing the dependency of the intensities of output light from a spatial light modulator on the intensities of inputted light to the spatial light modulator.

In respect of the above-mentioned two driving methods, mean values of the intensities of the output light responding to respective intensities of writing lights have been calculated. The calculated results are shown in FIG. 12. In FIG. 12, characteristic curve 1210 shows the case of driving the spatial light modulator by using the driving signals not including writing pulse in one unit of driving signal, for example, 107 shown in time-chart (c) in FIG. 1 and the other characteristic curve 1202 shows the case of driving the spatial light modulator by using the driving signals including a writing pulse 112 in one unit of driving signal, for example, 114 shown in time-chart (e) in FIG. 1. In both driving methods, it was found that the half-tone representation could be controlled when the intensity of the writing light is in a range from 100 to 1000 $\mu W/cm^2$. The contrast ratio of the mean value of the intensity of the output light from the spatial light modulator is calculated as 53:1 in the case of using the driving signals 108, and as 32:1 in case of using the driving signals 115. The contrast ratios in both cases are satisfactory.

FOURTH EXPERIMENT

The frequencies of the above-mentioned two driving signals have been changed without changing the waveforms and voltages of them for measuring the uniformity of the brightness of the output light in the optical system shown in FIG. 9. The image displayed on the CRT screen 901 and having a uniform brightness was written in the spatial light modulator configured as shown in FIG. 8. As an index for non-uniformity in the brightness of the image, ratios R of the intensities of the darkest parts in the output side of the spatial light modulator 902 to those of the brightest parts have been calculated. The calculated ratios are shown in the following table 1. $T_{SLM}$ designates the period of the unit of driving signal of the spatial light modulator, $T_{CRT}$ designates one frame cycle of the CRT, $R_1$ and $R_2$ respectively designate the above-mentioned ratios of R when the spatial light modulator is driven by the driving signals 108 and 115 shown in FIG. 1. $T_{CRT}$ is fixed to be 16.7 msec.

TABLE 1

| $T_{SLM}$ (msec) | $T_{CRT}/T_{SLM}$ | $R_1$ | $R_2$ |
|---|---|---|---|
| 0.00835 | 2000 | — | — |
| 0.0167 | 1000 | 1.0 | 1.0 |
| 0.167 | 100 | 1.0 | 1.0 |
| 1.67 | 10 | 1.1 | 1.1 |
| 8.35 | 2 | 1.2 | 1.3 |
| 11.1 | 1.5 | 2.1 | 2.0 |
| 16.7 | 1 | 11.3 | 12.7 |
| 33.4 | 0.5 | — | — |

From the table 1, it is found that when the value of $T_{CRT}/T_{SLM}$ is in a range from 1.5 to 1000, the intensity of the output light becomes substantially uniform. When the value of $T_{CRT}/T_{SLM}$ is larger than 1000, the switching speed of the ferroelectric liquid crystal does not follow the change of the voltage of driving signals, so that the contrast of the image decreases. When the value of $T_{CRT}/T_{SLM}$ is smaller than 1, flicker of the output light becomes an eyesore, and thereby the quality of the image decreases.

FIFTH EXPERIMENT

With respect to the driving signals 108 in time-chart (c) in FIG. 1, the widths of the erasing pulse 105 and reading period 106 were respectively fixed to be 0.1 msec and 1.1 msec, and only the voltages of them were changed for driving the spatial light modulator 817 shown in FIG. 8. In case of fixing the voltage of erasing pulse 105 at 10 V and changing the voltage in the reading period 106 in a range from −30 V to +2 V, the quality of reproduced image did not decrease. When the voltage in the reading period 106 was larger than +2 V, the photo-conductive layer 807 of the spatial light modulator 817 shown in FIG. 8 did not generate photocurrent in the reading period 106, so that the brightness of the output light from the spatial light modulator was reduced. Furthermore, in the case of fixing the voltage in the reading period 106 at −0.91 V and changing the voltage of erasing pulse 105 in a range from +2 V to +30 V, the quality of the reproduced image did not decrease so much. When the voltage of erasing pulse 105 was smaller than +2 V, the photo-conductive layer 807 of the spatial light modulator 817 was forward-biased positively, so that the recorded information on the spatial light modulator 817 was not erased properly, and thereby the contrast of the image decreased.

SIXTH EXPERIMENT

The spatial light modulator 817 shown in FIG. 8 were driven by the driving signals 115 shown in time-chart (e) in FIG. 1 deformed from those used in the afore-mentioned second experiment by changing one of the voltages among the erasing pulse 110, writing pulse 112 and second lower voltage period 113. In the case of changing only the voltage of the erasing pulse 110, a high quality image was obtained in a range from +2 V to +30 V for the same reason as the afore-mentioned case of changing the voltage of driving signals 108. In the case of changing only the voltage of writing pulse 112, a high quality image was obtained in a range from −30 V to −2 V. When the voltage was larger than −2 V, a high quality image could be obtained, but it was substantially equivalent to the result of changing the voltage of driving signals 108. In the case of changing the voltage in the second lower voltage period 113, a high quality image was obtained in a range from −30 V to −2 V. This second lower voltage period 113 is considered to correspond to the reading period 106 in the driving signals 108 shown in time-chart (c) in FIG. 1, so that the spatial light modulator can be driven properly in a voltage range in which the photo-conductive layer can generate the photocurrent.

SEVENTH EXPERIMENT

Figure 13:
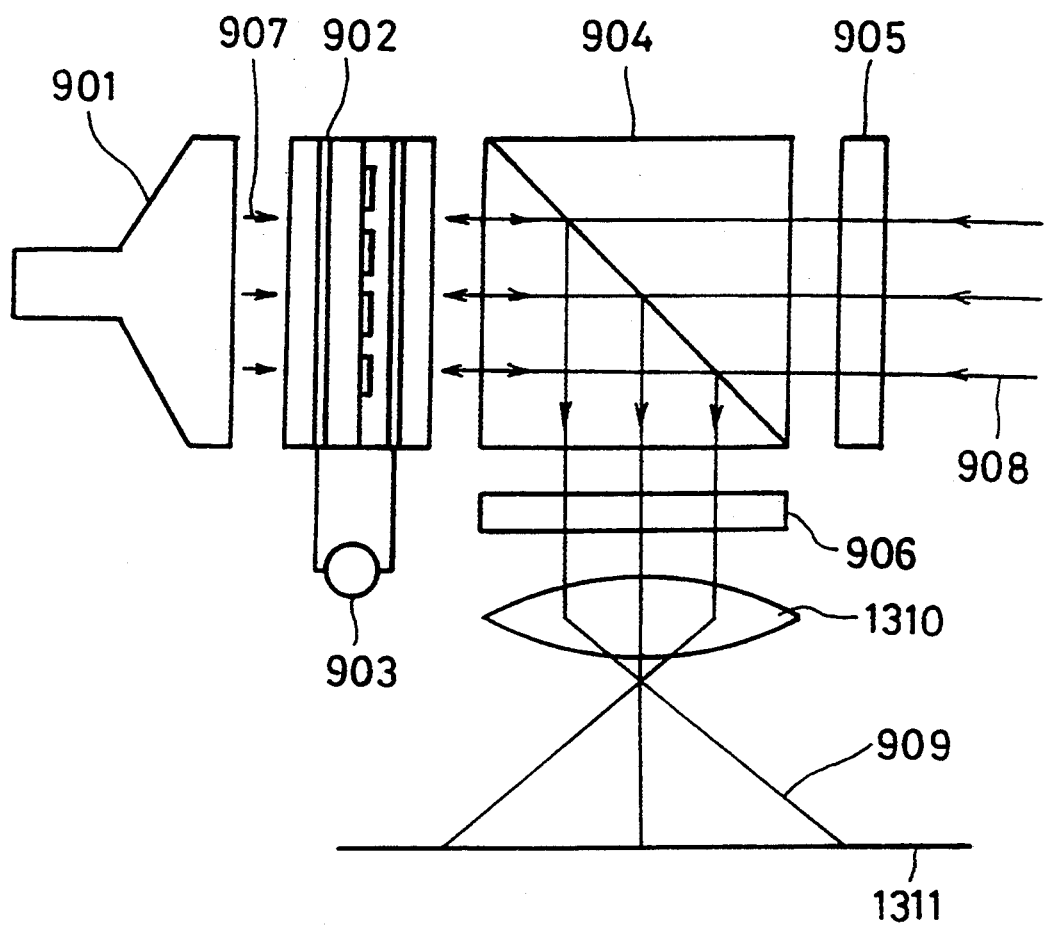
FIG. 13 is a schematic drawing showing a projection-type display apparatus containing a spatial light modulator driven by the driving method in accordance with the present invention.

As shown in FIG. 13, the optical system shown in FIG. 9 has been attached to a projection type display which displays an expanded image. The elements in FIG. 13 which are designated by the same numerals in FIG. 9 are substantially the same, so that explanations of them are omitted. The output light from the optical system is enlarged and projected on a screen 1311 by a lens 1310. The area of the spatial light modulator 902 is 2.5 cm×2.5 cm, but is enlarged to 100 cm×100 cm on the screen 1311. When the spatial light modulator 902 having substantially the same configuration as the spatial light modulator 816 shown in FIG. 8 was driven by the driving signals 108 or 115 shown in the time-chart (c) or (e) in FIG. 1, an image with high quality was obtained on the screen 1311. At that time, the illuminance on the screen 131 was 1,000 lx. The contrast ratio of the image on the screen 1311 was 100:1. Even though one pixel of the spatial light modulator 902 was expanded to 1 mm×1 mm on the screen 1311, the crosstalk between the adjoining pixels was not observed and a fine image was obtained.

In addition, three sets of the optical systems comprising the CRT 901 and spatial light modulator 902 respectively corresponding to the colors of red, green and blue could have been composed for superimposing the images on the screen 1311, thereby obtaining a color image.

EIGHTH EXPERIMENT

Figure 14:
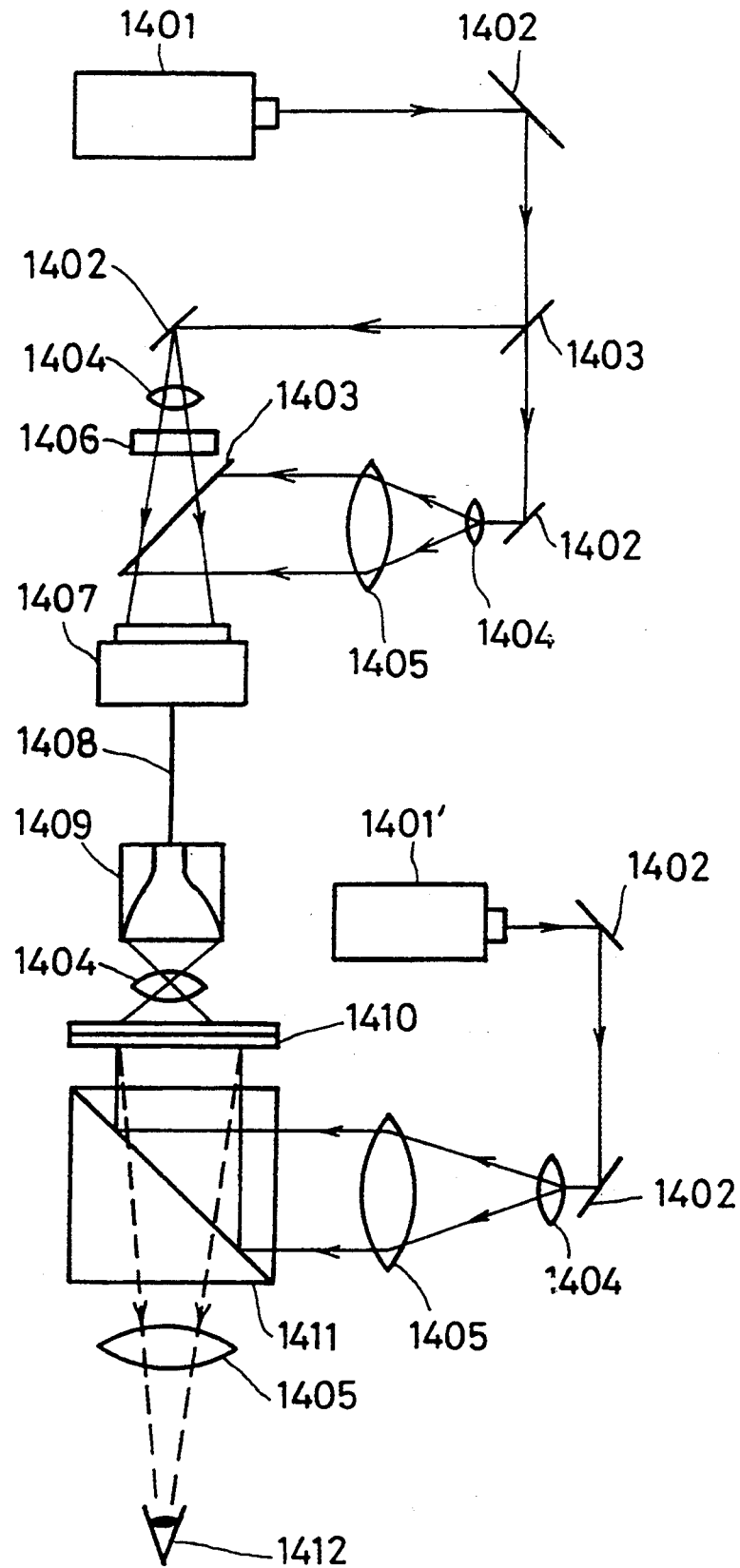
FIG. 14 is a schematic drawing showing a holographic television set including a spatial light modulator driven by the driving method in accordance with the present invention.

As shown in FIG. 14, a holographic television set used a spatial light modulator 1410 having substantially the same configuration as shown in FIG. 8. As a coherent light source, He-Ne laser 1401 is used for irradiating an object 1406. In FIG. 14, numerals 1402 designate reflection mirrors, numerals 1403 designate half mirrors, numerals 1404 designate lenses, and numerals 1405 designate collimators. The light beam through the object 1406 formed an interference fringe pattern on an image pickup surface of a CCD 1407 with reference light beam through the collimator 1405. Such image data formed on the CCD were transmitted to the CRT 1409 through a video signal transmission cable 1408. An image displayed on a screen of the CRT 1409 was focused on an input surface of the spatial light modulator 1410 by the focusing lens 1404. Therefore, the interference fringe pattern was inputted to the spatial light modulator 1410. Furthermore, the spatial light modulator 1410 reproduced the interference fringe pattern on an output face thereof. Coherent light from another He-Ne laser 1401 was used for reading out a stereoscopic image from the spatial light modulator 1410 in a reflection mode. The interference fringe pattern reproduced on the spatial light modulator 1410 was read out by the coherent reference light through a beam splitter 1411. Therefore, the stereoscopic image could be reproduced and observed by an observer 1412 in real time.

In the above-mentioned experiments, the driving method for the spatial light modulator in accordance with the present invention is suitable to be used in the projection type display reproducing an image having high luminance, high resolution, high contrast, and half-tone representation. Furthermore, the holographic television set using the spatial light modulator driven by the driving method in accordance with the present invention can reproduce the real time stereoscopic image.

The invention may be embodied in other specific forms without departing from the spirit or essential characteristics thereof. The present embodiment is to be considered in all respects as illustrative and not restrictive, the scope of the invention being indicated by the appended claims rather than by the foregoing description, and all changes which come within the meaning and range of equivalency of the claims are intended to be embraced therein.

What is claimed is:

1. A method for driving a spatial light modulating apparatus, which produces frames of output light comprising:
   providing a spatial light modulating apparatus having an output face, a photo-conductive layer with rectification and a ferroelectric liquid crystal layer provided between a pair of transparent electrodes, with an inputting face of the photo-conductive layer facing toward a light information inputting device which produces light signals of different intensities in successive frames, each frame being defined as the period measured between a peak intensity of one light signal and a peak intensity of a successive light signal; and
   applying plural units of a same driving signal between said pair of transparent electrodes during each frame of the light information inputting device.

2. The driving method for a spatial light modulating apparatus in accordance with claim 1, wherein
   a ratio of the period of each frame over a period of each unit of a same driving signal is in a range from 1.5 to 1000.

3. The driving method for a spatial light modulating apparatus in accordance with claim 2, wherein
   each unit of a same driving signal consists of an erasing voltage period and a writing voltage period.

4. The driving method for a spatial light modulating apparatus in accordance with claim 3, wherein
   said erasing voltage is in a range from +2 V to +30 V and said writing voltage is in a range of −30 V to +2 V, wherein a direction of the voltage which biases said photo-conductive layer forward is defined to be positive.

5. The driving method for a spatial light modulating apparatus in accordance with claim 2, wherein
   each unit of a same driving signal consists of a series of an erasing voltage period, a first lower voltage period, a writing voltage period and a second lower voltage period.

6. The driving method for a spatial light modulating apparatus in accordance with claim 5, wherein
   a length of said second lower voltage period is longer than a length of said second lower voltage period.

7. The driving method for a spatial light modulating apparatus in accordance with claim 6, wherein
   said erasing voltage is in a range from +2 V to +30 V, said writing voltage is in a range of −30 V to −2 V and voltage of said second lower voltage period is in a range from −2 V to +2 V, wherein a direction of the voltage which biases said photo-conductive layer forward is defined to be positive.

8. A spatial light modulating apparatus comprising:
   a photoconductive layer having a rectification function, a ferroelectric liquid crystal layer provided between a pair of transparent electrodes, said photoconductive layer having an input face which faces a light information input device, said light information input device of a type which produces light signals of different intensities in successive frames, each frame being defined as the period measured between the peak intensity of one light signal and that of a successive light signal; and
   means for providing plural units of a same driving signal between said pair of transparent electrodes during each frame of said light information input device.

* * * * *